United States Patent
Grocutt et al.

(10) Patent No.: US 10,210,349 B2
(45) Date of Patent: Feb. 19, 2019

(54) DATA PROCESSING APPARATUS AND METHOD USING SECURE DOMAIN AND LESS SECURE DOMAIN

(71) Applicant: ARM Limited, Cambridge (GB)

(72) Inventors: Thomas Christopher Grocutt, Impington (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 617 days.

(21) Appl. No.: 13/735,350

(22) Filed: Jan. 7, 2013

(65) Prior Publication Data

US 2013/0205413 A1    Aug. 8, 2013

Related U.S. Application Data

(63) Continuation-in-part of application No. 13/368,419, filed on Feb. 8, 2012.

(30) Foreign Application Priority Data

Oct. 1, 2012 (GB) .................................. 1217531.1
Nov. 19, 2012 (GB) .................................. 1220769.2

(51) Int. Cl.
*G06F 21/64* (2013.01)
*G06F 21/52* (2013.01)
(Continued)

(52) U.S. Cl.
CPC .............. *G06F 21/64* (2013.01); *G06F 21/52* (2013.01); *G06F 9/30134* (2013.01); *G06F 9/462* (2013.01); *G06F 2221/2105* (2013.01)

(58) Field of Classification Search
CPC ...... G06F 21/64; G06F 9/30134; G06F 9/462; G06F 2221/2105; G06F 21/52
(Continued)

(56) References Cited

U.S. PATENT DOCUMENTS 4,177,514 A    12/1979  Rupp
4,488,227 A    12/1984  Miu et al.
(Continued)

FOREIGN PATENT DOCUMENTS

CN    100524224    8/2009
CN    101661440    3/2010
(Continued)

OTHER PUBLICATIONS

ARM Limited, ARM®v7-M Architecture Reference Manual, Feb. 2010, ARM Limited, C_errata_v3, https://web.eeecs.umich.edu/~prabal/teaching/eecs373-f10/readings/ARMv7-M_ARM.pdf on Dec. 16, 2014.*
(Continued)

*Primary Examiner* — Carl G Colin
*Assistant Examiner* — Gary E Lavelle
(74) *Attorney, Agent, or Firm* — Nixon & Vanderhye P.C.

(57) ABSTRACT

A data processing apparatus has processing circuitry which has a secure domain and a less secure domain of operation. When operating in the secure domain the processing circuitry has access to data that is not accessible in the less secure domain. In response to a control flow altering instruction, processing switches to a program instruction at a target address. Domain selection is performed to determine a selected domain in which the processing circuitry is to operate for the instruction at the target address. Domain checking can be performed to check which domains are allowed to be the selected domain determining the domain selection. A domain check error is triggered if the selected domain in the domain selection is not an allowed selected domain.

26 Claims, 11 Drawing Sheets

(51) Int. Cl.
*G06F 9/30* (2018.01)
*G06F 9/46* (2006.01)

(58) Field of Classification Search
USPC .......................................................... 726/30
See application file for complete search history.

(56) References Cited

U.S. PATENT DOCUMENTS

| | | | |
|---|---|---|---|
| 4,519,032 A | 5/1985 | Mendell | |
| 5,590,332 A | 12/1996 | Baker | |
| 5,812,850 A | 9/1998 | Wimble | |
| 6,363,474 B1* | 3/2002 | McCulley et al. | 712/202 |
| 6,993,663 B1 | 1/2006 | Paya et al. | |
| 7,120,794 B2* | 10/2006 | Kelley et al. | 713/164 |
| 7,966,466 B2 | 6/2011 | Kershaw et al. | |
| 7,984,257 B2 | 7/2011 | Funk et al. | |
| 2002/0099933 A1 | 7/2002 | Nevill et al. | |
| 2004/0003377 A1* | 1/2004 | Di Loreto | 717/136 |
| 2004/0139346 A1* | 7/2004 | Watt et al. | 713/200 |
| 2004/0168047 A1* | 8/2004 | Fukai et al. | 712/229 |
| 2005/0044292 A1 | 2/2005 | McKeen | |
| 2005/0177666 A1 | 8/2005 | Kimelman et al. | |
| 2006/0224866 A1* | 10/2006 | Grisenthwaite et al. | 712/226 |
| 2006/0259487 A1 | 11/2006 | Havens et al. | |
| 2007/0204259 A1* | 8/2007 | Wilner et al. | 717/124 |
| 2008/0216175 A1 | 9/2008 | Pike | |
| 2008/0250216 A1 | 10/2008 | Kershaw et al. | |
| 2008/0250217 A1* | 10/2008 | Kershaw et al. | 711/163 |
| 2010/0031360 A1 | 2/2010 | Seshadri et al. | |
| 2010/0057960 A1 | 3/2010 | Renno | |
| 2010/0082927 A1 | 4/2010 | Riou | |
| 2010/0325397 A1* | 12/2010 | Craske | 712/222 |
| 2011/0225402 A1 | 9/2011 | Grisenthwaite | |
| 2012/0036299 A1 | 2/2012 | Renno | |
| 2012/0036341 A1* | 2/2012 | Morfey et al. | 712/229 |
| 2012/0042154 A1* | 2/2012 | Grisenthwaite | 712/229 |

FOREIGN PATENT DOCUMENTS

| | | |
|---|---|---|
| EP | 0 859 319 | 8/1998 |
| GB | 2448149 | 10/2008 |
| GB | 2482701 | 2/2012 |
| JP | 09091154 A | 4/1997 |
| JP | H10-228421 | 8/1998 |
| JP | H11-272462 | 10/1999 |
| JP | 2002-526822 | 8/2002 |
| JP | 2004-280801 | 10/2004 |
| JP | 2004-288155 | 10/2004 |
| JP | 2007-58776 | 3/2007 |
| JP | 2008-257735 | 10/2008 |
| JP | 2010-503107 | 1/2010 |
| JP | 2010-186386 | 8/2010 |
| JP | 2011-216118 | 10/2011 |
| WO | 02/42914 | 5/2002 |
| WO | WO 2007/089373 | 8/2007 |
| WO | 2008/030093 | 3/2008 |
| WO | WO 2010/004240 | 1/2010 |
| WO | 2011/114124 | 9/2011 |

OTHER PUBLICATIONS

GB Search Report dated Aug. 14, 2013 in GB 1220769.2.
International Search Report and Written Opinion of the International Searching Authority dated Oct. 7, 2013 in PCT/GB2013/052107.
International Search Report and Written Opinion of the International Searching Authority dated Sep. 27, 2013 in PCT/GB2013/052108.
ARM Limited, "Cortex-M3 Technical Reference Manual" Revision: r1p1, 2005, 42 pages.
International Search Report and Written Opinion of the International Searching Authority dated Sep. 20, 2013 in PCT/GB2013/052105.
International Preliminary Report on Patentability dated Aug. 21, 2014 in PCT/GB2013/050029, 6 pages.
U.S. Appl. No. 13/680,352, filed Nov. 19, 2012, Grocutt et al.
U.S. Appl. No. 13/680,298, filed Nov. 19, 2012, Grocutt.
U.S. Appl. No. 13/368,419, filed Feb. 8, 2012, Grocutt et al.
Office Action dated Dec. 2, 2014 in co-pending U.S. Appl. No. 13/368,419, 74 pages.
Office Action dated Dec. 26, 2014 in co-pending U.S. Appl. No. 13/680,352, 38 pages.
Office Action dated Dec. 4, 2014 in co-pending U.S. Appl. No. 13/680,298, 44 pages.
ARM Limited, Cortex-M3, Revision: r1p1, Technical Reference Manual, 2006, ARM Limited, downloaded from http://infocenter.arm.com/help/topic/com.arm.doc.ddi0337e/DDI037E_cortex_m3_r1p1_trm.pdf on Oct. 2, 2014, pp. 1-22, 2, 3, 5-2, 5-9, 5-10, 5-11 and 5-22 (384 pages).
ARM Limited, ARM Procedure Call Standard for the ARM Architecture, Oct. 16, 2009, release 2.08, downloaded from https://web.eecs.umich.edu/~prabal/teaching/eecs373-f11/readings/ARM-AAPCS-EABI-v2.08.pdf on Dec. 14, 2014, 34 pages.
ARM Limited, Corex-M3Technical Reference Manual, Jun. 13, 2007, ARM Limited, Revision r1p1, Chapters 5, 10 and 11, downloaded from http://infocenter.arm.com/help/topic/com.arm.doc.ddi0337e/DDI0337E_cortex_m3_r1p1_trm.pdf, 97 pages.
Cocke et al, "Scheme to Improve the Call/Return Performance on the RS/6000" Jul. 1, 1993, IBM, pp. 143-145.
International Preliminary Report on Patentability dated Oct. 7, 2014 in PCT/GB2013/052107, 6 pages.
International Preliminary Report on Patentability dated Apr. 16, 2015 in PCT/GB2013/052105, 5 pages.
International Preliminary Report on Patentability dated Apr. 16, 2015 in PCT/GB2013/052108, 6 pages.
Office Action dated Jun. 22, 2015 in co-pending U.S. Appl. No. 13/368,419 79 pages.
Office Action dated Jan. 21, 2016 in co-pending U.S. Appl. No. 13/368,419 66 pages.
English translation of Chinese Office Action dated Jun. 28, 2016 in CN 201380008433.5, 10 pages.
English translation of Japanese Office Action dated Feb. 13, 2017 in JP 2013-012980, 8 pages.
English translation of Chinese Office Action dated Jan. 3, 2017 in CN 201310038646.4, 13 pages.
Office Action dated Jan. 17, 2018 in co-pending U.S. Appl. No. 14/795,933, 29 pages.
Office Action dated Feb. 22, 2018 in co-pending U.S. Appl. No. 15/284,830, 31 pages.
Israeli Office Action dated Oct. 2, 2017 in IL 237280 and English translation, 2 pages.

* cited by examiner

```
   less secure                    secure bob(                           joe (string password)
   (                              (
   joe (password)                    GUARD  ─── 102
    ┌─ BL joe                       if (password == STORED PASSWORD)
100─┤  ┌─                           (
    │  │ LR = PC+4                       fred ()
    │  │ PC = joe                   )
    │  └─                           BX LR ─── 104
   )                               )
                                   fred ()
                                   (
                                        ⋮
                                   secure processing
                                        ⋮
                                   )
```

FIG. 3A

```
   less secure                    secure bob()                          joe (string password)
   (                              (
                                     GUARD
106 ── MOV LR,fred                   if (password == STORED PASSWORD)
108 ── MOV PC, joe                   (
          =                              fred ()
                                     )         ┌─ 104
   )                               BX LR ──────┤  ! less secure code can
                                   )           │    trigger branch to Fred
                                   fred () ◄───┘    without password !
                                   (
                                        ⋮
                                   secure processing
                                        ⋮
                                   )
```

FIG. 3B

DATA PROCESSING APPARATUS AND METHOD USING SECURE DOMAIN AND LESS SECURE DOMAIN

This application is a Continuation-in-Part of U.S. application Ser. No. 13/368,419, filed 8 Feb. 2012, and claims priority to GB Application No. 1217531.1, filed 1 Oct. 2012, and GB Application No. 1220769.2, filed 19 Nov. 2012, the entire contents of each of which are hereby incorporated by reference.

FIELD OF THE INVENTION

The present invention relates to the field of data processing. More particularly, the present invention relates to a data processing apparatus and method using a secure domain and a less secure domain.

BACKGROUND OF THE INVENTION

A data processing apparatus may be able to operate in a secure domain and a less secure domain. When operating in the secure domain, data can be accessed that is not accessible when operating in the less secure domain. This provides a way of isolating potentially sensitive data and code from access by unauthorized persons or processes.

One way of keeping data and code secure is provided by ARM® of Cambridge UK, with their Trustzone architecture where there are secure and non-secure states and an exception instruction is used to transition between the states, the exception handler protecting the security of the secure side. Although this approach provides a high degree of security, considerable software intervention in the form of the software exception handler is required to change security states which both reduces the performance of the system and increases the amount of effort required to develop an external application program interface API for the secure software as all calls must be proxied through the exception hander.

For a small system such as microcontrollers, it may be more important to achieve a compromise between the level of security and the performance of the system, and so keep the overheads associated with implementing the secure domains reasonably low.

SUMMARY OF THE INVENTION

According to a first aspect, the present invention provides a data processing apparatus comprising:
processing circuitry for performing data processing operations in response to program instructions, the processing circuitry having a plurality of domains of operation including a secure domain and a less secure domain, wherein when operating in the secure domain the processing circuitry has access to data that is not accessible when operating in the less secure domain;
wherein in response to execution of a control flow altering instruction, the processing circuitry is configured to switch to processing a program instruction at a target address indicated by the control flow altering instruction, and to perform domain selection for determining a selected domain in which the processing circuitry is to operate for the program instruction at the target address; and
at least if the control flow altering instruction is executed while operating in the secure domain, then the processing circuitry is configured to:

(i) perform domain checking for determining which of the plurality of domains are allowed to be the selected domain determined by the domain selection for the program instruction at the target address, the domain checking using a different technique to the domain selection; and
(ii) trigger a domain check error if the selected domain determined in the domain selection is not an allowed selected domain determined in the domain checking.

In the present technique, a control flow altering instruction may be used to switch processing between the plurality of domains. This means that it is not necessary to use an exception and a corresponding software exception handler to control changes between domain, and hence improves performance. However, it is important that a control flow altering instruction does not circumvent the security safeguards of the system.

Following the control flow altering instruction, the selected domain in which the program instruction at the target address is to be processed is determined using a domain selection technique. Hence, the same control flow altering instruction could be used to switch to processing in different domains depending on the domain selection technique being used.

The present technique recognises that a security risk could occur if the behaviour of a control flow altering instruction, which is intended by the programmer to switch to processing of a program instruction in one domain, is altered by code in the less secure domain so that it instead switches to processing of a program instruction in a different domain. For example, the code in the less secure domain may change the target address of the control flow altering instruction. As an example, there may be a control flow altering instruction to be executed in the secure domain which is intended to cause a switch to an instruction in the less secure domain. However, the target address of the control flow altering instruction may be set by code in the less secure domain to point to a program instruction to be processed in the secure domain, so that now the control flow altering instruction may instead switch to processing in the secure domain. This could allow a hacker to use code in the less secure domain to trigger an uncontrolled transition from the secure domain to secure code, since typically a secure-to-secure switch would not be policed because secure processing is expected to be trusted. This could lead to a security breach.

To address this problem, the processing circuitry may perform domain checking at least when a control flow altering instruction is executed while in the secure domain. The domain checking determines which of the plurality of domains are allowed to be the selected domain determined by domain selection for the program instruction at the target address. The domain checking does not influence the actual domain in which the system will operate for the instruction at the target address, because this is determined by domain selection. However, the domain checking allows the system to verify that the control flow altering instruction has resulted in the expected domain transition. A domain check error can be triggered if the domain determined in the domain selection is not an allowed selected domain determined in the domain checking. In this way, if less secure code causes the control flow altering instruction to behave in an unexpected way, then an error can be triggered to guard against unauthorized access to secure data.

The control flow altering instruction may be any instruction which causes a non-sequential transition in the instructions being processed. Most commonly, the control flow altering instruction may comprise a branch instruction. However, the control flow altering instruction may also include other kinds of instructions, for example a load instruction which loads a value to the register which stores the program counter indicating the next instruction to be processed.

It is not essential to perform domain checking for control flow altering instructions executed while in the less secure domain. This may seem counterintuitive since one would generally expect that the instructions in the less secure domain should be subject to more stringent checks. However, often there will be some other mechanism for regulating transitions from the less secure domain to the secure domain. On the other hand, it is when in the secure domain that the type of attack described above is most problematic, since generally when the system is already in the secure domain, code would be trusted and assumed to be acting correctly, and so this could be exploited by a hacker using less secure code to change the behaviour of a control flow altering instruction in the secure domain. Therefore, the domain checking is performed at least for a control flow altering instruction executed while in the secure domain.

Nevertheless, if desired the domain checking could also be performed when a control flow altering instruction is executed while operating in the less secure domain. As well as guarding against security breaches, the domain checking can also be used to detect corrupted instructions or target addresses whose bit values have, owing to a particle strike or other kind of error, changed state so that the instruction now does not behave as expected. This can be useful in both the secure domain and the less secure domain.

In addition to control flow altering instructions, the domain selection could also be performed for other instructions. For example, in some systems the processing circuitry could determine for each instruction which domain the instruction should be processed in.

The domain selection and the domain checking use different techniques to determine the selected domain and allowed domain(s) so that the domain selection can be verified by a different form of domain checking. For example, a first determining can be used for one of the domain selection and the domain checking and a second determining used for the other. A technique which in one embodiment is used for the domain selection may in another embodiment be used for the domain checking, and vice versa.

In one embodiment, there may be a data store which has a plurality of regions including a secure region and a less secure region, the secure region being for storing data which is accessible by the processing circuitry when operating in the secure domain and is not accessible when in the less secure domain. The less secure region can be accessible both when in the secure domain and when in the less secure domain.

Hence, the first determining may comprise determining at least one selected domain in dependence upon at least which of the regions corresponds to the instruction address of the program instruction at the target address. In general the less secure domain may be selected as the selected domain if the instruction address of the program instruction corresponds to the less secure region, and the secure domain may be selected if the instruction address corresponds to the secure region. This technique may be used for either the domain selection or the domain checking.

Which region corresponds to the instruction address may not be the only criterion in the first determining. For example, for certain instructions the first determining may also be dependent on the type of program instruction at the target address. Also, where first determining is used for the domain checking then multiple domains could be selected as an allowed selected domain.

The second determining may comprise determining, as the selected domain (or one of several allowed selected domains in the case of the domain checking) one of the plurality of domains that is indicated by a target domain value. The target domain value may be maintained by the processor to indicate in which domain the program instruction at the target address is expected to be processed. This may be part of the domain selection or the domain checking.

Hence, in one example the domain selection may be performed based on the region of the data store corresponding to the instruction address of the program instruction at the target address, and the domain checking may be performed based on the target domain value. In this case, the target domain value provides a check for verifying whether the control flow altering instruction has switched to a program instruction in the correct region. In another example, the target domain value may be used to control the actual domain in which the program instruction at the target address is to be processed, and the domain checking may then verify that the target address is in the correct region of the data store.

The target domain value may be represented in different ways. In one example, the target domain value may be specified in the encoding of a control flow altering instruction. For example, there may be several versions of the control flow altering instruction corresponding to different target domain values which indicate different security domains as the selected domain. When writing a program, the programmer can select which version of the control flow altering instruction to use so that the control flow of the altering instruction will cause the appropriate domain to be selected as the selected domain (in the case of domain selection) or the allowed domain(s) (in the case of domain checking).

Alternatively, the target domain value may be specified in part of the target address used by a control flow altering instruction. This form of the target domain value can be useful for indirect control flow altering instructions which identify a register which stores the target address.

The target domain value may be set in response to a target domain value setting instruction. This allows the programmer to control the expected transition of a following control flow altering instruction by including a target domain value setting instruction to be executed before the control flow altering instruction. For example, if a function pointer is set while in the less secure domain, then before using the function pointer in the secure domain, the target domain setting instruction can be executed to set the expected behaviour for the control flow altering instruction.

One example of a target domain value setting instruction is a guard instruction which is used to protect transitions from the less secure domain to the secure domain. It is often important to avoid uncontrolled switches to the middle of a secure function, because this can sometimes circumvent security checks performed earlier in the secure function. To prevent such switching, the system can require that, at the point at which processing switches from the less secure domain to the secure domain, a guard instruction must be present. If, following a control flow altering instruction for which the processing circuitry was operating in the less secure domain before switching to processing a program instruction at the target address in a secure region, the program instruction at the target address is not a guard instruction, then an error can be triggered. Hence, the guard instruction should be used to mark trusted entry points to secure code. The guard instruction can be useful for setting the target domain value, since when a target address is set in the less secure domain for use in the secure domain, there must be an entry to the secure domain and hence a guard instruction will be executed. By using the guard instruction to set the target domain value, it is not necessary to execute a further instruction for this purpose.

In particular, the guard instruction may be useful for setting the target domain value for a return address to which a subsequent control flow altering instruction will switch processing to. The presence of a guard instruction often means that programmer expects that there is a risk that a function in the secure domain could have been called by less secure code, and so there could be a subsequent function return control flow altering instruction which triggers processing to switch to a program instruction at a return address specified by the less secure domain. To protect against this possibility, the guard can be used to set the target domain value for the return address to set up the expected transition for the function return.

In one example, the target domain value can be set to indicate the less secure domain if the processing circuitry was operating in the less secure domain before the target domain value setting instruction was performed. For example, if the target domain value setting instruction is the guard instruction, then if the system was in the less secure domain before switching to the guard instruction it will be expected that a subsequent function return should switch back to the less secure domain.

The data store may have a plurality of stacks including a secure stack and a less secure stack, with the secure stack being accessible when in the secure domain and not being accessible when in the less secure domain. The less secure stack can be accessed from the secure domain and the less secure domain.

When a function is called using a control flow altering instruction, sometimes it may be desirable to pass function arguments (data values) from the code being executed before the function call for use by the code executed after the function call. A stack may be used for passing the function arguments. If the function call causes a transition from the secure domain to the less secure domain then the arguments would need to be placed on the less secure stack since the secure stack would not be accessible to the processing circuitry. On the other hand, if a function call causes a transition from the secure domain to the secure domain then the arguments should be placed in the secure stack to prevent less secure code from accessing these data values. Therefore, when executing a function call in the secure domain, the determination of which stack to use will depend on the domain of operation following the function call. The target domain value can provide a quicker indication of which domain the function call is expected to switch to than other techniques such as based on the target address. Therefore, reusing the target domain value for determining which stack to use for passing function arguments enables a quicker switch to the function and therefore improved processing performance.

Another use for the target domain value is in setting a function return address. Generally when calling a function a first control flow altering instruction will be executed, and when returning from the function a second control flow altering instruction will be executed. On occurrence of the first control flow altering instruction a return address is typically stored at a predetermined storage location (e.g. the link register) to indicate the location to which processing should return in response to the second control flow altering instruction. One issue which arises when calling a function in the less secure domain from code in the secure domain is that the return address may be sensitive and so it may be desirable to prevent the less secure domain gaining access to the return address.

To address this problem, in response to the first control flow altering instruction when executed in the secure domain and causing a transition to the less secure domain, a dummy return address may be stored to the predetermined storage location, the dummy return address not being a valid instruction address. The actual return address may be stored to a secure storage location that is not accessible while in the less secure domain (for example a secure stack or a secure memory region). When the second control flow altering instruction is executed, the processor detects that the return address is the dummy return address, which then causes the actual return address to be retrieved from the secure storage location. The processing can then be switched to the actual return address to return from the function.

Hence, when calling a function from the secure domain, it is useful to be able to determine whether the function will be processed in the secure domain or the less secure domain to determine whether the actual return address or dummy return address should be stored to the predetermined storage location. This can be done quickly and easily using the target domain value.

The target domain value can be represented in various ways. It can be useful to use a redundant data field in either the encoding of the control flow altering instruction or the target address used by the control flow altering instruction. For example, a field originally intended for a given functionality may not be relevant if that functionality is not supported by the data processing apparatus and so this field can be reused to indicate the target domain value. This avoids needing to add an additional bit field for the target domain value.

For example, some systems can execute instructions from multiple instruction sets. In such systems, the control flow altering instruction or the target address may include a target instruction set field indicating whether the instruction at the target address will be from the first instruction set or the second instruction set. This allows the processor to determine how to decode the instruction at the target address when executing a control flow altering instruction. Other systems may only be capable of executing one of these instruction sets, but may still execute instructions designed for systems supporting two instruction sets. In this case, the target instruction field of the instruction or the target address may become redundant. Hence, this field can be reused to indicate the target domain value.

The target instruction set field may have a first value indicating the first instruction set and a second value indicating the second instruction set. Where the first instruction set is the instruction set that is supported by the processing circuitry and the second instruction is not supported by the processing circuitry, it can be useful to map the values of the target instruction set field to values of the target domain value such that the first value indicates the secure domain as the selected domain and the second value indicates the less secure domain as the selected domain. Since only the first instruction set is supported, this will mean that existing control flow altering instructions in software written using instructions of the first instruction set will specify the first value of the target instruction set field. Since generally most control flow altering instructions executed in the secure domain are intended to cause transitions to other locations in the secure domain, it is useful to map this value to a target domain value indicating the secure domain so that relatively few instructions or target addresses will need to be modified to indicate a different target domain value. Only the target domain values for control flow altering instructions in the secure domain which are intended to switch to the less secure domain would need to be altered (e.g. by adding an earlier target domain value setting instruction to indicate the less secure domain as the selected domain). Hence, adopting this mapping of the target instruction set field to the target domain value enables backwards compatibility with legacy code.

When this mapping of the target domain value is used, it is useful to omit performing the domain checking when a control flow altering instruction is performed in the less secure domain to improve backwards compatibility with legacy code. Most control flow altering instructions in the less secure domain will cause a transition to another instruction also in the less secure domain. However, using the above mapping of the target domain value the legacy instructions of the first instruction set will indicate the first value in the target instruction set field, which will indicate that the secure domain is expected to be the selected domain. Hence, if domain checking was also performed in the less secure domain then the target domain values associated with most control flow altering instructions to be executed in the less secure domain would need to be modified to prevent a domain check error. This would reduce the backwards compatibility of the system with legacy code. Since in any case the domain checking is less important for the instructions in the less secure domain, because other mechanisms such as the guard instruction may already be provided for controlling transitions from the less secure domain to the secure domain, then it can be more efficient to omit the domain checking when in the less secure domain so that previously written code does not need to be modified.

Often, the domain checking will determine a single domain as an allowed selected domain for the program instruction. For example, in secure code there may be a control flow altering instruction which is supposed to switch back to the less secure domain, and so only the less secure domain can be selected as an allowed domain.

However, on other occasions it may be useful to determine a plurality of the domains as allowed selected domains for the same program instruction. For example, there may be some control flow altering instructions in the secure domain that may sometimes be used to switch to the secure domain and sometimes be used to switch to the less secure domain. In this case, by selecting a plurality of allowed domains then this instruction can be executed without triggering a domain check error regardless of which domain the instruction switches to. In another example, since the domain check error is not so critical when in the less secure domain, for a control flow altering instruction in the less secure domain both domains could be set as allowable domains.

Another instruction for which can be useful to select multiple allowed domains is the guard instruction. For example, the same program function may be called from either the secure domain or the less secure domain, in which case a guard instruction would usually be present at the start of the function to indicate an allowed entry point from the less secure domain. If calling the function from the less secure domain, it may be desirable to defer switching from the less secure domain until it is determined whether the guard instruction is present, so that if there is not a guard instruction then there has been no switch to secure domain. Hence, the guard instruction may be able to operate in either domain depending on whether the function is called from the secure domain or the less secure domain. To prevent a domain check error occurring in this case, then it may be convenient to set both the secure domain and the less secure domain as allowed domains for the guard instruction, irrespective of which region of memory the guard instruction is in or the value of the target domain value.

For at least one control flow altering instruction executed in the secure domain, it can sometimes be useful to switch from operating in the secure domain to operating in the less secure domain before switching to processing the program instruction at a target address. This means that, following the switch, the system will appear to have come from an instruction in the less secure domain and so a guard instruction will be required to avoid an error. This is useful for control flow altering instructions which may not be trusted to switch to a safe entry point in the secure domain, for example a control flow altering instruction for which the target domain value indicates the less secure domain as an allowed domain (in this case it is likely that less secure code has set the target address for the control flow altering instruction).

Viewed from another aspect the present invention provides a data processing apparatus comprising:

processing means for performing data processing operations in response to program instructions, the processing means having a plurality of domains of operation including a secure domain and a less secure domain, wherein when operating in the secure domain the processing means has access to data that is not accessible when operating in the less secure domain;

wherein in response to execution of a control flow altering instruction, the processing means is configured to switch to processing a program instruction at a target address indicated by the control flow altering instruction, and to perform domain selection for determining a selected domain in which the processing means is to operate for the program instruction at the target address; and at least if the control flow altering instruction is executed while operating in the secure domain, then the processing means is configured to:
(i) perform domain checking for determining which of the plurality of domains are allowed to be the selected domain determined by the domain selection for the program instruction at the target address, the domain checking using a different technique to the domain selection; and
(ii) trigger a domain check error if the selected domain determined in the domain selection is not an allowed selected domain determined in the domain checking.

Viewed from a further aspect, the present invention provides a data processing method for an apparatus comprising processing circuitry for performing data processing operations in response to program instructions, the processing circuitry having a plurality of domains of operation including a secure domain and a less secure domain, wherein when operating in the secure domain the processing circuitry has access to data that is not accessible when operating in the less secure domain; the method comprising:

in response to execution of a control flow altering instruction, switching to processing a program instruction at a target address indicated by the control flow altering instruction;

performing domain selection for determining a selected domain in which the processing circuitry is to operate for the program instruction at the target address; and at least if the control flow altering instruction is executed while operating in the secure domain, then:

(i) performing domain checking for determining which of the plurality of domains are allowed to be the selected domain determined by the domain selection for the program instruction at the target address, the domain checking using a different technique to the domain selection; and (ii) triggering a domain check error if the selected domain determined in the domain selection is not an allowed selected domain determined in the domain checking.

The above, and other objects, features and advantages of this invention will be apparent from the following detailed description of illustrative embodiments, which is to be read in connection with the accompanying drawings.

BRIEF DESCRIPTION OF THE DRAWINGS

FIG. 3A illustrates an example of program code in which an instruction in a less secure domain sets the target address for a branch instruction in the secure domain;

FIG. 3B illustrates a security issue which can occur if a hacker modifies the less secure code of FIG. 3A;

DETAILED DESCRIPTION OF EMBODIMENTS

Figure 1:
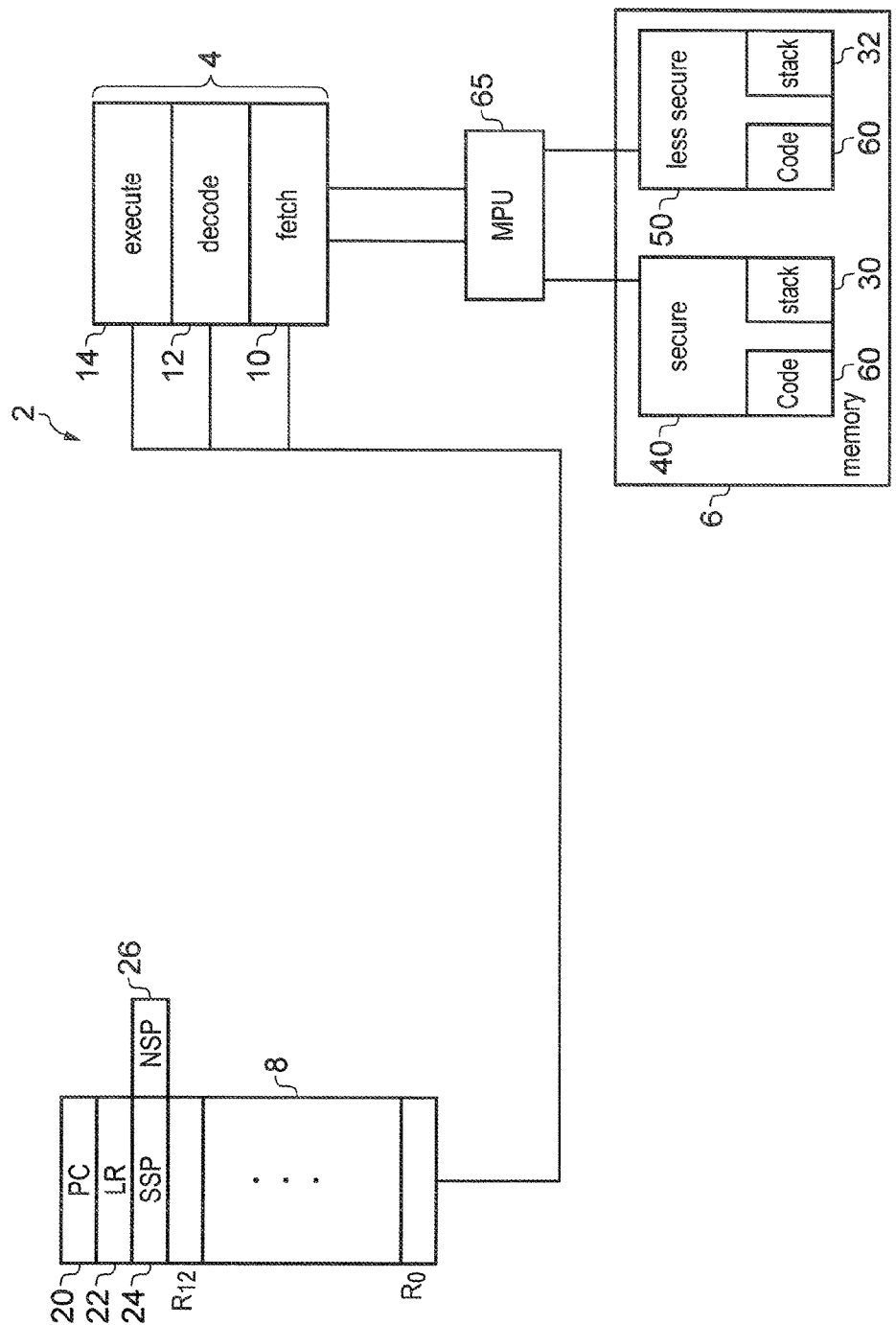
FIG. 1 schematically illustrates data processing apparatus.

FIG. 1 schematically illustrates a data processing apparatus 2 comprising processing circuitry 4, a data store (memory) 6 and registers 8. The data store may include at least one cache as well as a main memory. The processing circuitry 4 comprises a processing pipeline which includes a fetch stage 10 for fetching instructions from memory 6, decode stage 12 for decoding the fetched instructions, and an execute stage 14 for executing the decoding instructions. It will be appreciated that the pipeline may include other types of stages, for example a register renaming stage or issue stage.

The registers 8 include several general purpose registers $R_0$ to $R_{12}$ for storing data on behalf of the processing circuitry 4. While FIG. 1 shows 13 general purpose registers $R_0$ to $R_{12}$, it would be appreciated that other numbers of registers may be provided, and optionally floating point registers for storing floating point values could also be provided. The registers 8 also include some special purpose registers including a program counter (PC) register 20, a link register (LR) 22 and stack point registers 24, 26. The program counter register 20 stores a program counter indicating the instruction address of the next program instruction to be executed by the processing circuitry 4. Generally, following execution of an instruction the program counter will be updated to indicate the next instruction from memory. However in response to a control flow altering instruction the program counter can be set to a value which does not follow sequentially from the previous value. The link register 22 may be set to store a return value used when returning from a function or an exception to determine which program instruction should be processed following completion of the function or exception. The stack point registers 24, 26 store stack pointers indicating the location of a stack 30, 32 within the memory 6. For example, the stack pointer can indicate the location of the last item placed on the stack 30, 32.

Figure 2:
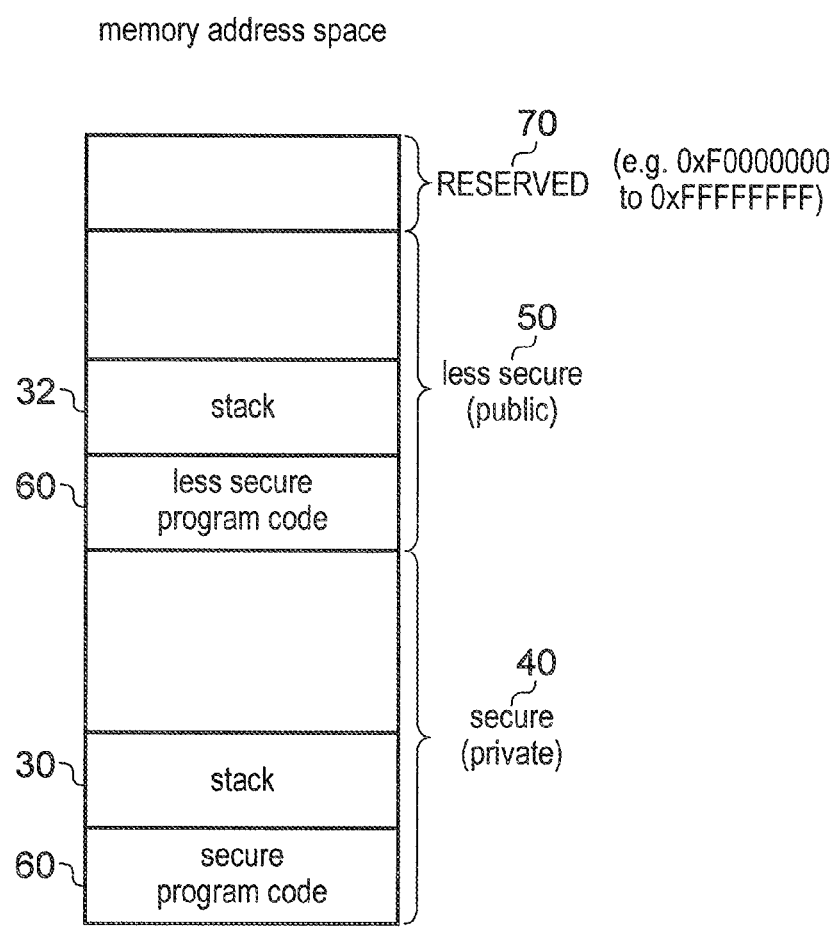
FIG. 2 illustrates a memory address space having a less secure region and a secure region.

The memory 6 includes a secure region 40 and a less secure region 50. As shown in FIG. 2, the memory address space of the address memory 6 may be divided into a secure region and a less secure region with some ranges of memory addresses corresponding to the secure region 40 of memory and other ranges of memory addresses corresponding to the less secure region 50. A memory protection unit (MPU) 65 can control the partitioning of the address space into different regions. Although FIG. 2 shows one secure region and one less secure region, it is also possible for the memory address space to include two or more discrete secure regions or two or more discrete less secure regions. The memory address space also includes a reserved address range 70 (e.g. address values of 0xF0000000 or higher) in which the address values do not correspond to any valid instruction address. These addresses can be used for special purposes such as in handling exception returns and function returns. Each of the secure region 40 and the less secure region 50 may include program code 60 and a corresponding stack 30, 32. Separate secure and non-secure stack pointer registers 24, 26 are used to maintain the stack pointers for a secure stack 30 in the secure region 40 and a less secure stack 32 in the less secure region 50.

The processing circuitry 4 can operate in a secure domain and a less secure domain. When the processing circuitry is in the secure domain, the processing circuitry 4 can access data and code in the secure region 40 of the memory 6 and can also access data and code in the less secure region 50. However, when the processing circuitry 4 is in the less secure domain then only the less secure region 50 can be accessed and the secure region 40 is inaccessible. This prevents untrusted code in the less secure domain accessing secure data. Although FIGS. 1 and 2 illustrate an example where there is one secure domain, one less secure domain, and corresponding secure and less secure regions 40, 50 of memory 6, it is also possible to provide more than two domains and regions. For example, there may be several secure domains, each with a security level, or several less secure domains. In some embodiments, each domain may have a different security level. In other embodiments, there could be multiple domains with the same security level.

In general, the system of FIG. 1 operates such that when the processing circuitry 4 is executing code from the secure region 40 of memory 6 then the processing circuitry 4 is in the secure domain and when the processing circuitry is executing code from the less secure region 50 for memory 6 then the processing circuitry 4 operates in a less secure domain. However, FIGS. 3A and 3B show an example of a security problem which could arise if this is the only domain determining technique that is used.

In FIG. 3A, the program code 60 includes a function bob( ) in a less secure domain and two functions joe( ) and fred( ) in the secure domain. The function joe( ) is called by bob( ) and checks whether a password provided by bob( ) is valid. If the password is valid, joe( ) calls the function fred( ) for performing secure processing. Clearly, it is desirable that the function fred( ) can only be executed if the password check in the function joe( ) is passed. FIG. 3A shows the case where the code operates correctly. Function bob( ) includes a branch instruction 100 which calls the function joe( ). As shown in FIG. 3A, the branch instruction 100 causes a return address (PC+4) to be placed in the link register 22 and the address of function joe( ) to be placed in the program counter register 20. The return address represents the address of the instruction to which processing should switch once the function joe( ) has finished. The updating of the program counter register 20 causes processing to jump to the start address of the function joe( ). Since the code for function joe( ) is stored in the secure region 40, joe( ) will be processed in the secure domain.

When changing from the less secure domain to the secure domain in response to a branch instruction or other control flow altering instruction, a guard instruction 102 must be present at the target address of the branch instruction 100, otherwise a guard check error will be triggered (this mechanism guards against branches in the less secure domain which branch to the middle of functions in the secure region of memory). In this case, a guard instruction 102 is present, so processing can continue in the secure domain. The function joe( ) then checks whether the password provided by bob( ) matches the stored password, and if so calls the function fred( ). When fred( ) is complete then another branch instruction 104 returns processing to the less secure domain by causing a branch to the program instruction whose address is stored in the link register 22.

FIG. 3B shows an example of a security leak where a hacker could gain access to the secure function fred( ) without the correct password. As shown in FIG. 3A, on calling joe( ), bob( ) is supposed to write the function return address PC+4 to the link register 22. However, instead a hacker could write bob( ) so that a MOV instruction 106 places the address of the function fred( ) in the link register 22. Hence, even if the password check in joe( ) fails because the correct password has not been supplied, the function return branch 104 in joe( ) will branch to the address stored in the link register 22, i.e. the address of function fred( ). Therefore, without the correct password the less secure domain has been able to cause the secure domain to perform the function fred( ).

Moreover, as the branch instruction 104 which caused the processing to switch to function fred( ) was executed in the secure domain, the system will not require a guard instruction to be present in fred( ). Hence, the hacker could use untrusted less secure code to trigger a branch to any arbitrary secure location in the memory 6, which could cause unauthorized access to secure data or secure code.

To prevent this type of attack, a target domain value is provided which provides a second technique for determining which domain the processor is expected to be operating in following a control flow altering instruction such as a branch instruction. Together with the first determining technique based on the target address of the control flow altering instruction, there are two different ways of determining the selected region. At least for control flow altering instructions executed in the secure domain, one technique can be used for selecting which domain the processor should actually operate in after the branch, and the other technique can be used to check that the selected domain is an allowed domain. An error can be triggered if the selected domain in the domain selection does not match an allowed domain, and hence the type of attack shown in FIG. 3B can be prevented.

Figure 4A:
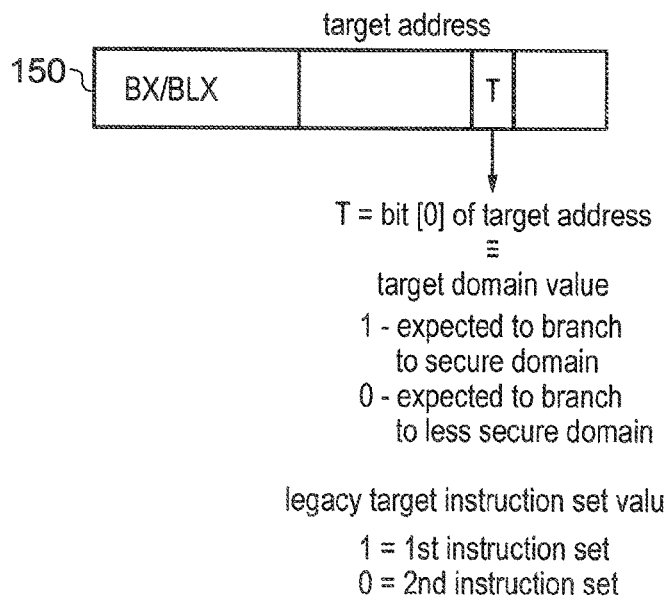
FIG. 4A illustrates an example of indicating a target domain value using part of the instruction encoding of a control flow altering instruction.
Figure 4B:
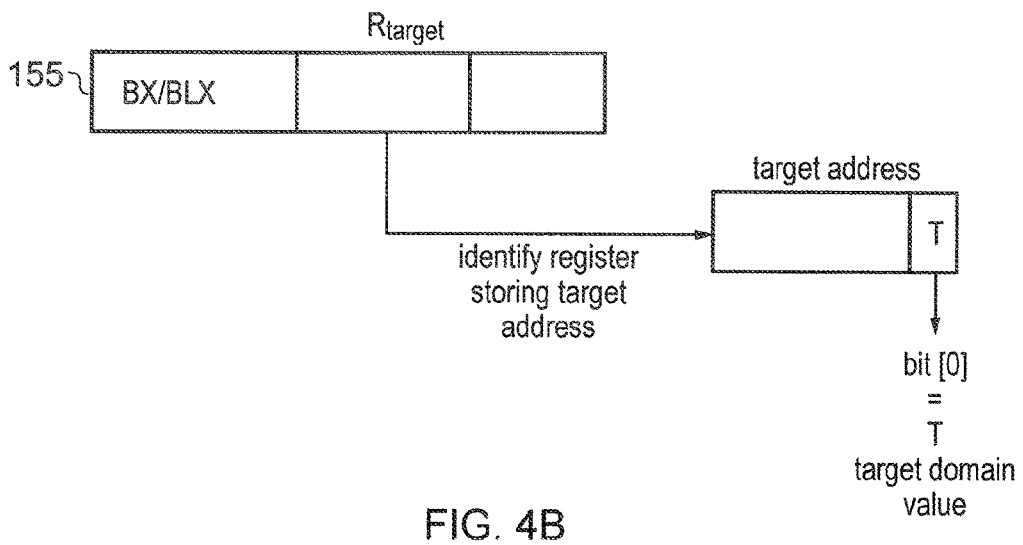
FIG. 4B shows an example in which the target domain value is represented by part of the target address of a control flow altering instruction.

FIG. 4A shows a first example of maintaining a target domain value. The control flow altering instruction 150, such as a branch instruction, can include a bit field T for representing the target domain value. If the target domain value T has one value (e.g. T=1) then it indicates that this instruction is expected to branch to the secure domain, and if it has another value (e.g. T=0) then the instruction is expected to branch to the less secure domain. FIG. 4B shows another example in which the target domain value T can be represented by a bit of the target address. This can be useful when a branch instruction or other control flow altering instruction 155 specifies a register which stores the target address. In the examples of FIGS. 4A and 4B, the target domain value is represented by a redundant bit field which was previously used to represent whether the instruction at the target address is from a first instruction set or a second instruction set. The processing circuitry 4 only supports the first instruction set and so this bit field has become redundant and so is reused for the target domain value. The mapping of the values of the target instruction set field to the target domain value that is shown in FIG. 4A improves backwards compatibility with legacy code.

Figure 5:
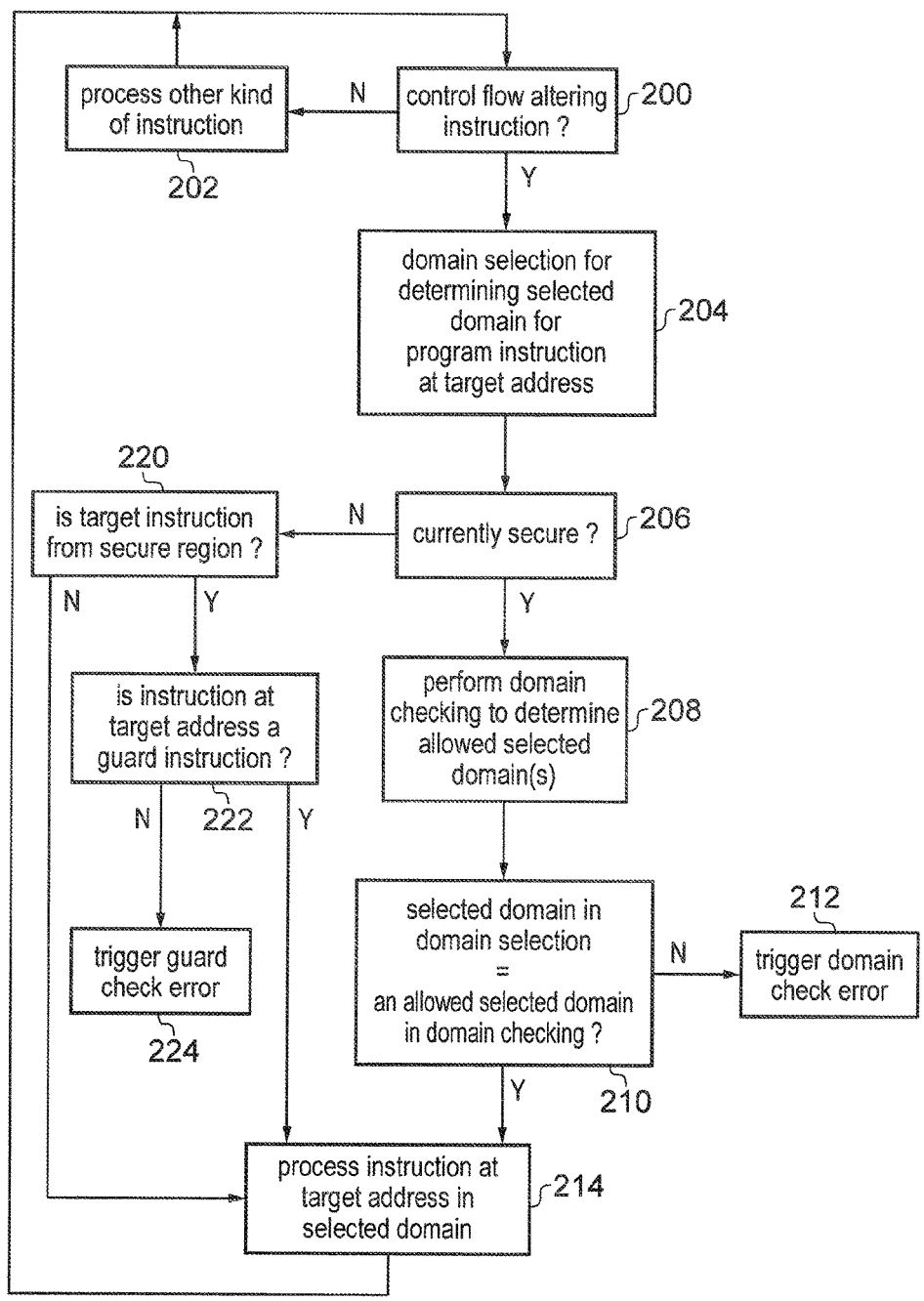
FIG. 5 illustrates a data processing method comprising domain selection and domain checking.

FIG. 5 shows an example of processing a control flow altering instruction. At step 200, the processing circuitry 4 determines whether the next instruction is a control flow altering instruction. A control flow altering instruction may be any instruction which causes a non-sequential change to the program counter register 20, such as a branch instruction or another instruction which loads the new value to the program counter register 20. If the instruction is not a control flow altering instruction then at step 202 the processing circuitry 4 processes the other kind of instruction. Processing then moves onto the next instruction.

If the current instruction is a control flow altering instruction then the method moves onto step 204 where the processing circuitry 4 determines which of the domains is the selected domain in which the processor 4 should operate for the program instruction at the target address. The timing at which this is performed may vary—e.g. it may be performed either in response to execution of the control flow altering instruction or in response to execution of the program instruction at the target address following the change of control flow. As will be discussed in FIGS. 6 and 7, the domain selection can be performed using a first determining technique or a second determining technique.

At step 206, the processing circuitry determines whether, the control flow altering instruction was executed in a secure domain. If so, then at step 208 the processing circuitry performs domain checking to determine which of the domains is an allowed selected domain which the domain selection is allowed to select for the program instruction at the target address. At step 210, the processing circuitry determines whether the domain which was selected at step 204 is an allowed selected domain selected at step 208. If not, then at step 212 a domain check error is triggered. On the other hand, if the selected domain matches an allowed selected domain, then at step 214 the instruction that the target address is processed in the selected domain. The method then returns to the step 200 for the next instruction.

Meanwhile, if at step 206 it was determined that the system was not in the secure state when executing the control flow altering instruction, then at step 220 it is determined whether the target instruction is from the secure region. If not, then the method proceeds to step 214 where the instruction at the target address is processed in the less secure domain. In this case, both the control flow altering instruction and the target instruction at the target address are in the less secure region and so the change is acceptable since there is no secure code being processed.

However, if at step 220 it is determined that the instruction at the target address is from the secure region, then at step 222 it is determined whether that instruction is a guard instruction. If not, then a guard check error is triggered at step 224 and the method ends. Hence, when changing from the non-secure domain to the secure domain, the first instruction after the switch must be a guard instruction. This prevents non-secure code being able to branch to any arbitrary point within secure code, which could cause a security leak. On the other hand, if at step 222 the instruction is a guard instruction then the method continues to step 214 where the instruction is processed and then the method returns to step 200 for the next instruction.

FIG. 5 shows an example in which domain checking is not performed if the control flow altering is executed in the less secure domain. However, if desired the domain checking could also be performed in the less secure domain.

Figure 6:
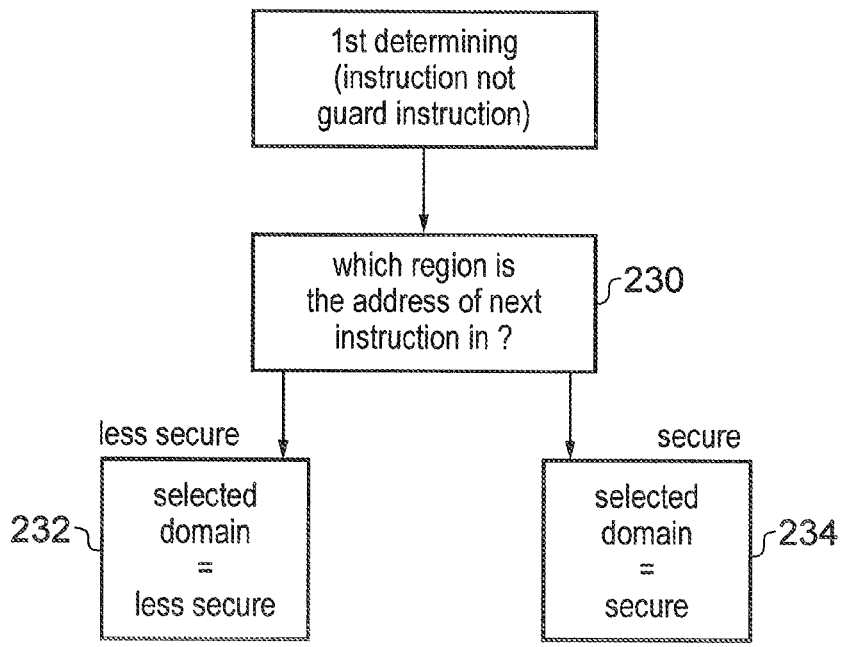
FIG. 6 illustrates an example of first determining which could be used for either the domain selection or the domain checking.
Figure 7:
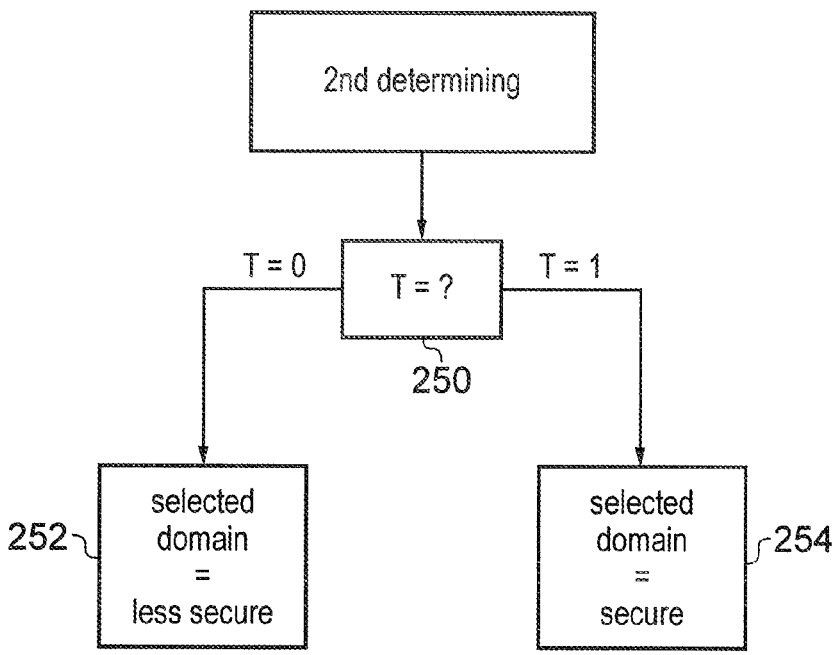
FIG. 7 illustrates an example of second determining which can be used for either the domain selection or domain checking.

FIG. 5 shows two techniques for determining the selected domain. The domain selection performed at step 204 determines the actual domain in which the instruction is to be processed. The domain checking is performed at step 208 to check that this domain is an allowed domain. FIGS. 6 and 7 show two determining techniques which could be used.

FIG. 6 illustrates a first domain determining technique. At step 230 the processing circuitry 4 determines which region of the memory 6 includes the address of the next instruction to be processed. For example, the processing circuitry 4 can send the address to the memory protection unit 65 which can return an indication of which memory region corresponds to the address. If the instruction address is in the less secure region 50 then at step 232 the less secure domain is selected as the selected domain, while if the instruction address is in the secure region 40 then at step 234 the secure domain is selected as the selected domain. This technique will generally be performed for most instructions, although there may be some exceptions. There could be some instructions for which a different technique or other parameters may be used to determine the selected domain. For example, as will be described later a guard instruction 102 may require a different technique.

FIG. 7 shows a second determining technique based on the target domain value shown in FIGS. 4A or 4B. At step 250 the value of the target domain value T is determined. If the target domain value has a value of 0, then at step 252 the less secure domain is selected as the selected domain, while if the target domain value has a target of 1 then at step 254 the secure domain is selected as the selected domain. It will be appreciated that a different mapping of domains to the values of the target domain value T can be used, although the mapping shown in FIGS. 4A and 7 is useful for backwards compatibility with legacy code.

The first determining and second determining shown in FIGS. 6 and 7 can be used for either the domain selection or the domain checking. In one example, the first determining shown in FIG. 6 can be used for the domain selection for selecting the actual domain in which the processor is to operate, and the second determining shown in FIG. 7 based on the target domain value can be used as the check to find what the allowed selected domain is. On the other hand, the target domain value (second determining) could be used to trigger the actual domain selection, while the address of the next instruction (first determining) can be used as a check to see whether the target address matched the domain indicated in the target domain value. Either way, code in the secure domain can be used to set the target domain value to indicate the domain to which the control flow altering instruction is expected to branch.

Figure 8:
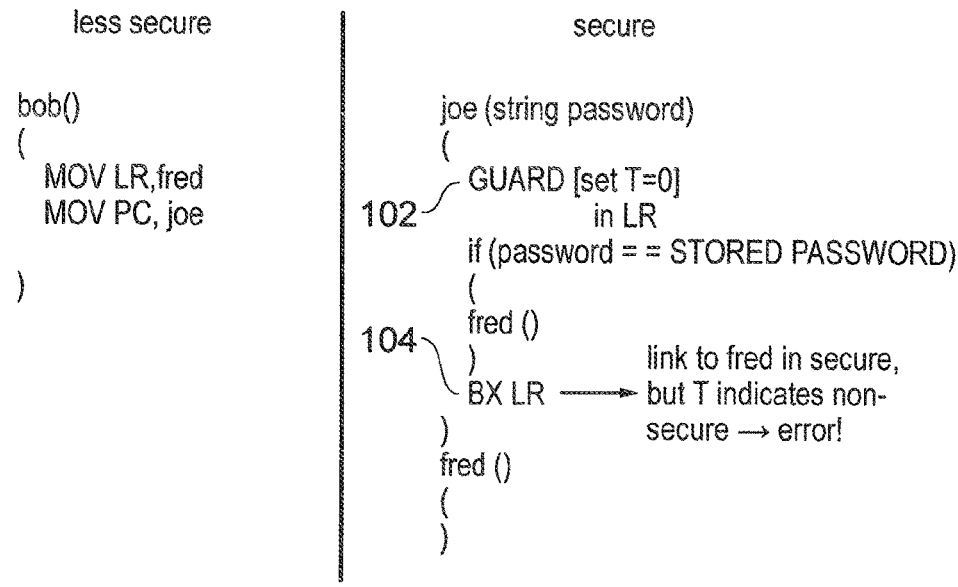
FIG. 8 shows an example of how the security issue illustrated in FIG. 3B can be prevented by performing domain checking to verify the domain selection.
Figure 9:
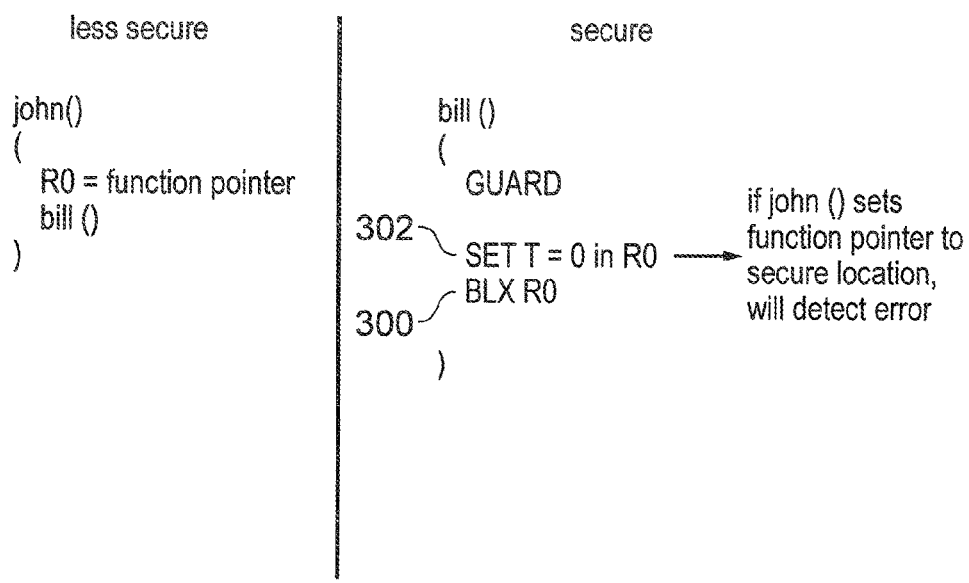
FIG. 9 shows an example of using a domain checking to protect against less secure code attempting to use a function pointer to access secure code.

FIGS. 8 and 9 show examples in which unauthorized access to secure code can be prevented using the domain checking. FIG. 8 shows the same situation as in FIG. 3B. Again, a hacker has written function bob( ) to place the address of function fred( ) in the link register 22, to try to cause function return branch instruction 104 in the secure domain 104 to switch to the secure function fred( ). However, in response to the guard instruction 102, the processing circuitry 4 sets the target domain value T for the address in the link register 22 to the value 0 indicating that the function return branch 104 should branch to an instruction in the less secure region of memory. When the function return branch instruction 104 is executed, processing actually switches to the function fred( ) in the secure region. Hence, there will be a mismatch between the first determining, which will determine based on the address of the first instruction of function fred( ) that the selected domain should be the secure domain, and the second determining, which will determine based on the target domain value that the selected domain should be the less secure domain. Regardless of which of the first and second determining represents the domain selection and which represents the domain checking, this mismatch will cause an error to be triggered, which will prevent further processing of secure function fred( ). Hence, this prevents the hacker using less secure code to trigger a branch from secure code to another secure location.

FIG. 9 shows another example where performing domain checking can be useful. In this case, the security risk comes from a function john( ) in the less secure domain storing a function pointer in a register R0, which a function bill( ) in the secure domain then uses to call a function. The branch instruction 300 which calls the function from bill( ) branches to the address indicated in register R0. If the function pointer has been set to a secure location, the less secure code can trigger the secure code to switch to an arbitrary secure location even if it is not a valid secure entry point marked by a guard instruction. Therefore, this could lead to a security breach.

However, by including an earlier target domain setting instruction 302 which sets the target domain value T to 0 to indicate that the function pointer should point to an address in the less secure domain, the programmer writing the secure function bill( ) can guard against this kind of attack. On branching to the function pointer location in response to branch instruction 300, if the hacker has set the function pointer to a secure value then the domain checking will determine a mismatch between the secure domain determined because the instruction is in the secure region, and the less secure domain indicated by the target domain value. Therefore, an error can be triggered and the security breach can be prevented.

Although FIGS. 8 and 9 show cases where an error is triggered, in other embodiments this error could be avoided if there is a guard instruction at the function pointer location indicating that this is an authorized change of control flow (see FIGS. 14 and 15 below).

As shown in FIGS. 8 and 9, a target domain value setting instruction preceding the branch instruction is used to set the target domain value to the desired value. The target domain value setting instruction could be a guard instruction as shown in FIG. 8, or another kind of target domain setting instruction shown in FIG. 9. Generally, the programmer of secure code should include a target domain value setting instruction in the program code before a control flow altering instruction in the secure domain to make sure that the control flow altering instruction behaves correctly.

The target domain value T may be useful for other purposes as well as the domain checking and domain selection. One example shown in FIGS. 10 and 11. This example relates to function calls and function returns. The functions bob( ), joe( ) etc. described above would typically be called using a first control flow altering instruction which places a function return address in the link register 22 and branches to an address corresponding to the first instruction of the function to be called, and then a second control flow altering instruction would return processing to the function return address. However, if a function is called from the secure domain and is to be executed in the less secure domain, then the return address may need to be hidden from the less secure code. Hence, a dummy return address can be stored in the link register. For example, the dummy return address could be one of the reserved range 70 of addresses shown in FIG. 2. The actual return address can be saved to the secure stack 30 for access in the secure domain when returning from the function call.

Figure 10:
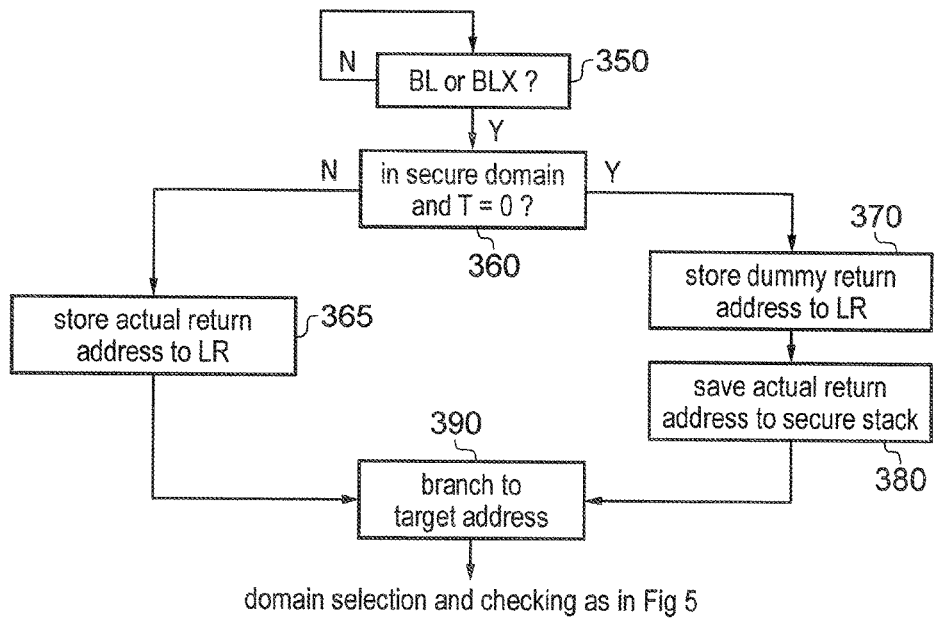
FIGS. 10 and 11 respectively show examples of handling a function call and function return.
Figure 11:
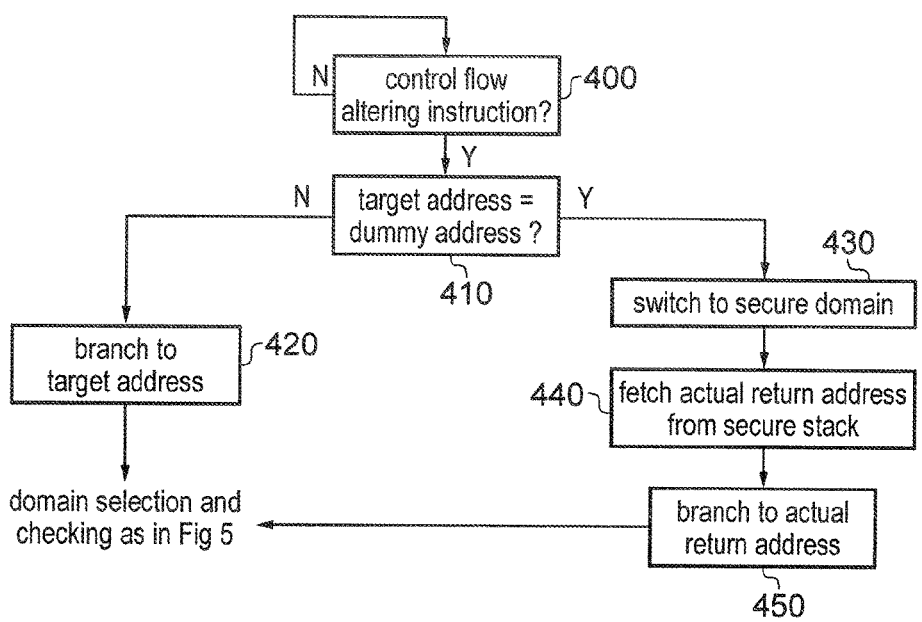

To make it easier to determine whether the dummy address or the actual return address should be saved to the link register 22, the target domain value T can be used. This is shown in FIGS. 10 and 11. FIG. 10 shows the processing when executing the first control flow altering instruction triggering the function call. At step 350, it is determined whether or not the next instruction is a branch instruction BL or BLX of the type that will place a return address in the link register. If so, at step 360 it is determined whether the processing is currently in the secure domain and the target domain value T for the branch indicates that the branch is expected to switch to the less secure domain. If this is not the case, then the actual return address is stored in the link register 22 at step 365. However, if at step 360 the processing is in the secure domain and the target domain value T indicates that the processing is expected to switch to the less secure domain (T=0), then at step 370 the dummy return address is stored to the link register 22. At step 380 the actual return address is saved to the secure stack. Regardless of which address is saved to the link register the method then proceeds to step 390 where the processing branches to the target address and the function is then processed. Domain selection and checking for the instruction at the target address would then proceed as shown in FIG. 5. At step 360 of FIG. 10 the target domain value enables a quicker determination of whether the dummy return address or the actual return address should be stored the link register than if this decision was based on the target address.

Eventually, another control flow altering instruction will be encountered (step 400 of FIG. 11). At step 410, it is checked whether the target address is the dummy address at step 410. If not, then the processing branches to the target address of the control flow altering instruction at step 420 as this is either a normal control flow altering instruction which is not a function return, or a function return for which the target address is the actual return address stored in the link register. On the other hand, if at step 410 it is determined that the target address is the dummy address, then at step 430 processing switches to the secure domain. At step 440 the actual return address is fetched from the secure stack in the secure regions 40 of memory. Then, at step 450 the processing branches to the actual return address and then domain selection and checking continues as normal.

Figure 12:
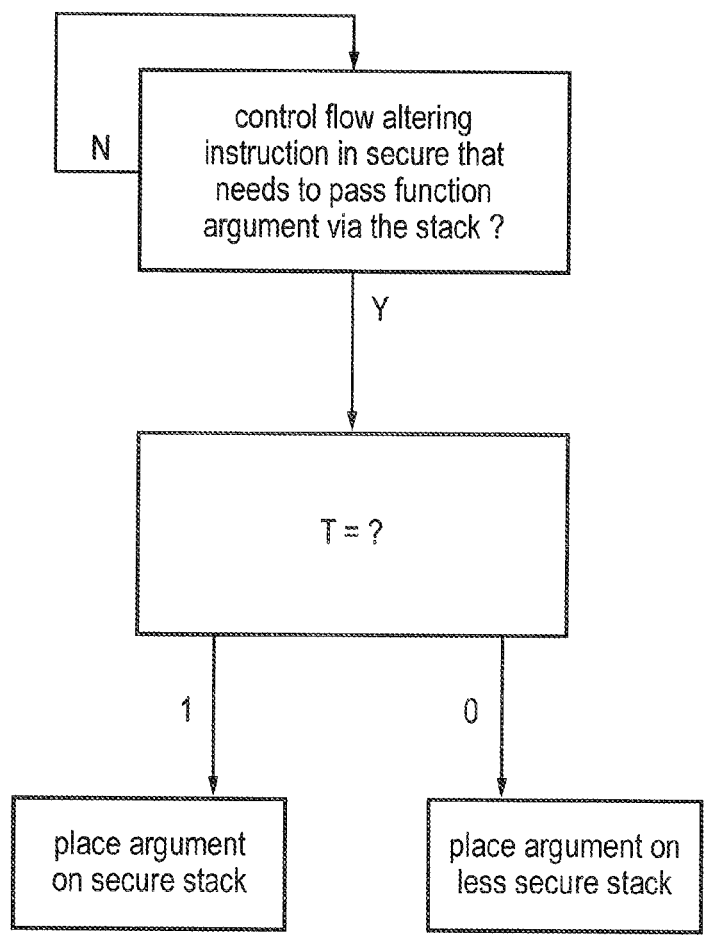
FIG. 12 shows an example of selecting which of a secure stack and a less secure stack to use for passing function arguments.

FIG. 12 shows another example where the target domain value can be useful. When calling a function, it is sometimes necessary for the caller function to pass a function argument to the callee function via the stack. If the function call is made from the secure domain, whether the function argument should be stored on the secure stack 30 or the less secure stack 32 will depend on whether the callee function is to be executed in the secure domain or the less secure domain. As shown in FIG. 12 the determination of which stack to use for passing the function arguments can be made using the target domain value T. Using the target domain value T enables a quicker determination of the target domain than checking with the memory protection unit 65 which region corresponds to the target address representing the location of the callee function. The determination of FIG. 12 may be performed either in hardware by the processing circuitry or in software by the code run by the processing circuitry.

Figure 13:
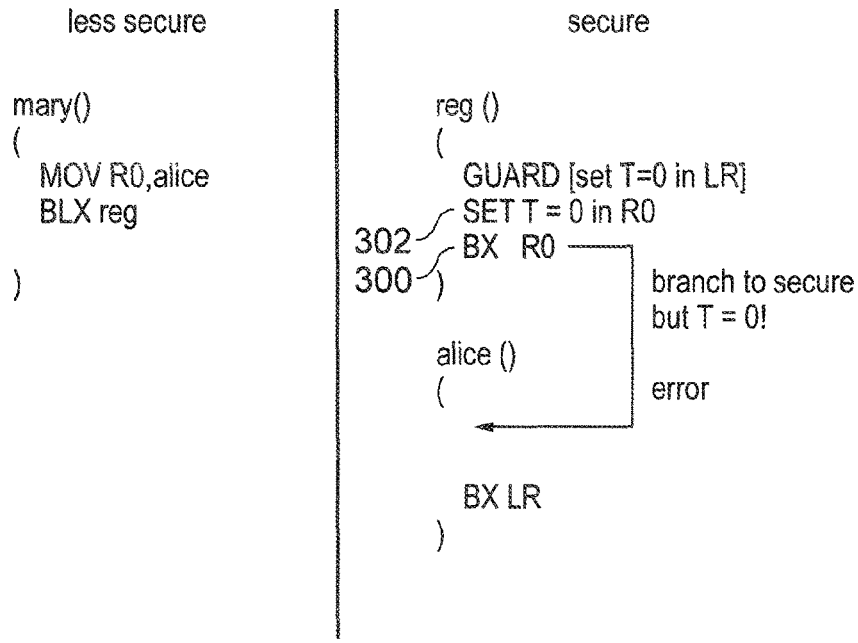
FIG. 13 shows an example of a situation in which it might be legitimate for less secure code to control secure code to switch to processing further secure code.

The examples shown so far have explained the domain checking in the context of a single domain being the allowed domain for a particular control flow altering instruction. However, in some cases it may be desirable to make several domains the allowed domain. FIG. 13 illustrates an example of this. FIG. 13 corresponds to the situation shown in FIGS. 9, but in this case function reg( ) includes a branch instruction 300 which should sometimes return to the less secure region and should other times switch to a trusted function alice( ) in the secure region, depending on the value placed in the register R0 by a less secure function mary( ). With the technique described above where the target domain value setting instruction 302 sets the target domain value of the function pointer in register R0 to indicate the less secure domain as the expected target domain, an error would be triggered when mary( ) sets the register R0 to a secure location. In this case, on executing the branch instruction 300 the target domain value would indicate the less secure domain as the selected domain, while on branching to function alice( ) the MPU 65 would determine the secure domain as the selected domain. If this particular branch is legitimate, it is desirable to avoid triggering an error in this case, but to still protect against unauthorized switches of this type.

Figure 14:
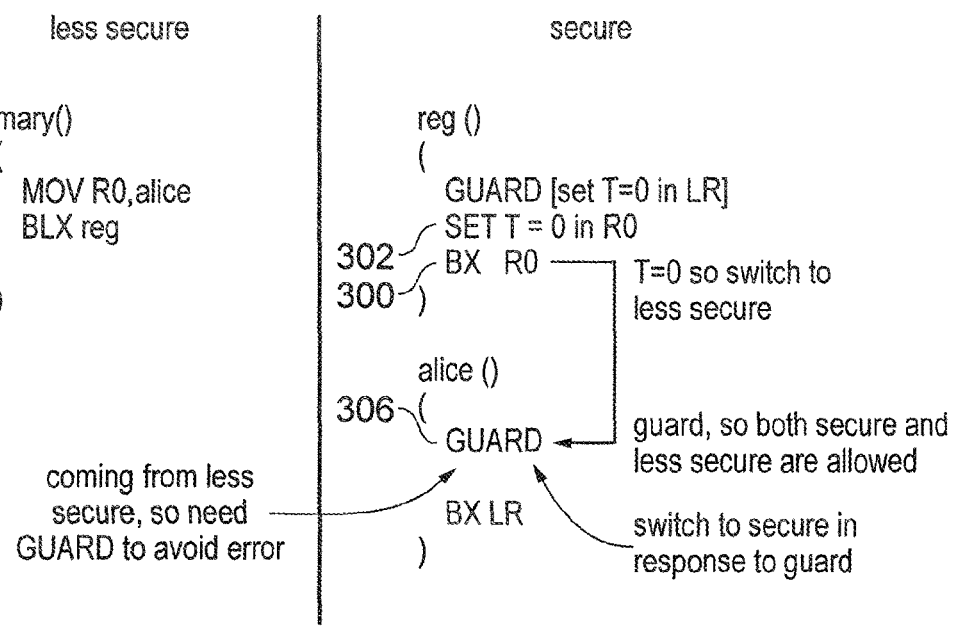
FIG. 14 shows a first example of how the situation in FIG. 13 can be achieved securely and without triggering an error.
Figure 15:
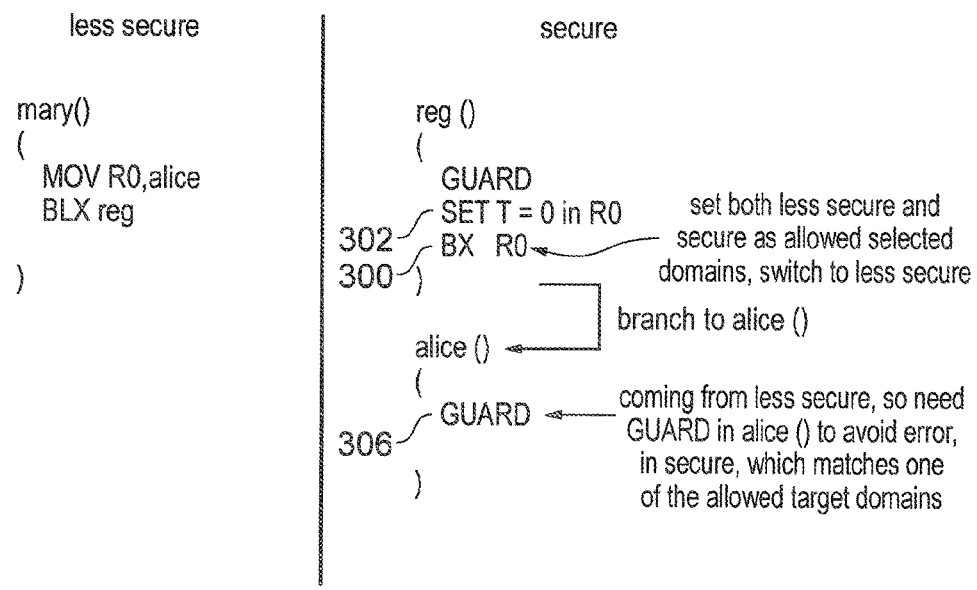
FIG. 15 shows a second example of how the situation in FIG. 13 can be achieved securely and without triggering an error.

FIGS. 14 and 15 show ways in which this could be addressed. For some program instructions, the system can determine multiple domains as the allowed domain, so that regardless of the behaviour following the branch instruction 300 the domain switching is allowed. However, to protect against unauthorized switches, the system can require that the first instruction following the branch instruction 300 is a guard instruction.

In the example of FIG. 14, the domain selection is based on the target domain value and domain checking based on the region determined by the MPU 65 for an address. For guard instructions, the MPU 65 determines both the secure domain and less secure domains as allowed domains. Hence, following branch 300, processing will switch to the less secure domain because the target domain value T was set to 0. However, for guard instruction 306 in alice( ), the domain checking based on the first determining selects both the secure and less secure domains as an allowed domain. Hence, the actual domain is the less secure domain and this matches one of the allowed domains and so there is no error. Similarly, for branches to alice( ) controlled by secure code, the target domain value would be set to 1 so that following the branch the system executes in the secure domain. Hence, alice( ) can be accessed from both secure code and less secure code, and branch 300 can correctly switch to both secure code and less secure code. If branch 300 resulted in a switch to a program instruction in the secure region that is not a guard instruction, an error would be triggered. Hence, unauthorized switches to arbitrary secure locations can still be avoided.

In another example shown in FIG. 15, the domain checking is based on the target domain value and the domain selection is based on the memory region to which the instruction address corresponds. In this case, in response to the branch instruction 300 both the less secure and secure domains are selected as allowed selected domains for the instruction at the target address (irrespective of the value of the target domain value). On branching to the guard instruction 306 in alice( ), the MPU 65 will determine the secure domain as the selected domain, which will match one of the allowed domains from the domain checking. Provided there is a guard instruction 306 at the target location, no error will be triggered.

Hence, regardless of which of the domain selection and domain checking uses the target bit, the system can allow some legitimate switches from the secure domain to a secure location under control of an address set by the less secure domain. The guard instruction is required to validate such switches. Usually the guard check would not be required when already in the secure domain, so to make sure the guard check is performed the system can switch to the less secure domain before executing a branch instruction 300 in the secure region of memory for which the target domain value has a value of 0. If the branch switches to the secure domain, the branch will appear to have come from the less secure domain, and so a guard instruction will be required at the target address to avoid an error.

The subject matter of the present application is related to subject matter discussed in commonly assigned co-pending U.S. application Ser. No. 13/368,419 and UK patent application number 1217531.1, and the entire contents of both of these documents are hereby incorporated by reference.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the claims.

The invention claimed is:

1. A data processing apparatus comprising:
processing circuitry for performing data processing operations in response to program instructions, the processing circuitry having a plurality of domains of operation including a secure domain and a less secure domain, wherein when operating in the secure domain the processing circuitry has access to data that is not accessible when operating in the less secure domain;
wherein in response to execution of a control flow altering instruction, the processing circuitry is configured to switch to processing a program instruction at a target address indicated by the control flow altering instruction, and to perform domain selection for determining a selected domain in which the processing circuitry is to operate for the program instruction at the target address; and
at least when the control flow altering instruction is executed while operating in the secure domain, then the processing circuitry is configured to:
(i) perform domain checking for determining which of the plurality of domains are allowed to be the selected domain determined by the domain selection for the program instruction at the target address, the domain checking using a different technique than the domain selection; and
(ii) trigger a domain check error when the selected domain determined in the domain selection is not an allowed selected domain determined in the domain checking,
wherein in response to execution of a control flow altering instruction while operating in the secure domain for which the domain selection determines that the secure domain is the selected domain, the processing circuitry is configured to trigger a domain check error when the secure domain is not an allowed selected domain determined in the domain checking, and to successfully switch control flow to the program instruction at the target address when the secure domain is an allowed selected domain determined in the domain checking,
wherein one of the domain selection and the domain checking comprises first determining and the other of the domain selection and the domain checking comprises second determining,
wherein the first determining comprises determining the selected domain in dependence upon at least which of a plurality of regions corresponds to an instruction address of the program instruction at the target address, said plurality of regions including a secure region and a less secure region, wherein the secure region is for storing data which is accessible by the processing circuitry when operating in the secure domain and not accessible by the processing circuitry when operating in the less secure domain, and
wherein the second determining comprises determining, as the selected domain in which the processing circuitry is to operate for processing said program instruction at the target address, one of the plurality of domains indicated by a target domain value other than the target address.

2. The data processing apparatus according to claim 1, wherein the control flow altering instruction comprises a branch instruction.

3. The data processing apparatus according to claim 1, wherein when the control flow altering instruction is executed while operating in the less secure domain, the processing circuitry is also configured to perform the domain checking and trigger the domain check error when the selected domain determined in the domain selection does not match an allowed domain determined in the domain checking.

4. The data processing apparatus according to claim 1, comprising a data store for storing data, the data store comprising said plurality of regions including a secure region and a less secure region.

5. The data processing apparatus according to claim 1, wherein for at least some program instructions the first determining comprises selecting the less secure domain as the selected domain when the instruction address corresponds to the less secure region, and selecting the secure domain as the selected domain when the instruction address corresponds to the secure region.

6. The data processing apparatus according to claim 1, wherein the target domain value is specified in an encoding of a control flow altering instruction.

7. The data processing apparatus according to claim 1, wherein the target domain value is specified in part of the target address used by a control flow altering instruction.

8. The data processing apparatus according to claim 1, wherein the processing circuitry is configured to set the target domain value in response to a target domain value setting instruction.

9. The data processing apparatus according to claim 8, wherein when the processing circuitry was operating in the less secure domain before said target domain value setting instruction was performed, then the processing circuitry is configured to set the target domain value to indicate the less secure domain.

10. The data processing apparatus according to claim 8, wherein the processing circuitry is configured to trigger an error when, following a guard-protected control flow altering instruction for which the processing circuitry was operating in the less secure domain before switching to processing the program instruction at the target address in a secure region, the program instruction at the target address is not a guard instruction; and
   the target domain value setting instruction comprises the guard instruction.

11. The data processing apparatus according to claim 10, wherein in response to a first control flow altering instruction, the processing circuitry is configured to store a return address to a predetermined storage location, and to switch to processing the program instruction at the target address; and
   in response to a second control flow altering instruction, the processing circuitry is configured to switch to processing the program instruction at the return address;
   wherein in response to the guard instruction, the processing circuitry is configured to set the target domain value for the second control flow altering instruction to indicate the less secure domain when the first control flow altering instruction was performed in the less secure domain.

12. The data processing apparatus according to claim 1, comprising a data store comprising a plurality of stacks including a secure stack and a less secure stack, wherein the secure stack is accessible by the processing circuitry when operating in a secure domain and not accessible by the processing circuitry when operating in a less secure domain.

13. The data processing apparatus according to claim 12, wherein at least one of the processing circuitry and software executed on the processing circuitry is configured to determine, in dependence on the target domain value, which of the plurality of stacks can be used for passing function arguments.

14. The data processing apparatus according to claim 1, wherein in response to a first control flow altering instruction, the processing circuitry is configured to store a return address to a predetermined storage location, and to switch the control flow to the program instruction at the target address; and
   in response to a second control flow altering instruction, the processing circuitry is configured to switch to processing the program instruction at the return address.

15. The data processing apparatus according to claim 14, wherein when the first control flow altering instruction is executed in the secure domain and causes a transition to the less secure domain, then the processing circuitry is configured to store a dummy return address to the predetermined storage location as the return address, the dummy return address not being a valid instruction address, and to store an actual return address to a secure storage location that is not accessible while in the less secure domain; and
   in response to the second control flow altering instruction, when the return address was the dummy return address then the processing circuitry is configured to retrieve the actual return address from the secure storage location and to switch to processing the program instruction at the actual return address.

16. The data processing apparatus according to claim 15, wherein the processing circuitry is configured to determine, depending on at least the target domain value, which of the dummy return address and the actual return address to store to the predetermined storage location in response to the first control flow altering instruction.

17. The data processing apparatus according to claim 1, wherein the target domain value is represented by a redundant data field in one of an encoding of the control flow altering instruction and the target address used by the control flow altering instruction.

18. The data processing apparatus according to claim 1, wherein the processing circuitry is configured to execute instructions from a first instruction set;
   one of an encoding of the control flow altering instruction and the target address used by the control flow altering instruction includes a target instruction set field indicating whether the program instruction at the target address is from the first instruction set or from a second instruction set, wherein the second instruction set is not supported by the processing circuitry; and
   the target domain value is indicated using the target instruction set field.

19. The data processing apparatus according to claim 18, wherein a first value of the target instruction set field indicates the first instruction set and corresponds to the target domain value indicating that the secure domain is the selected domain; and
   a second value of the target instruction set field indicates the second instruction set and corresponds to the target domain value indicating that the less secure domain is the selected domain.

20. The data processing apparatus according to claim 19, wherein the domain checking comprises the second determining, and when the control flow altering instruction is performed while in the less secure domain, then whether or not the domain check error is generated following the switch to processing the program instruction at the target address is independent of the value of the target domain value.

21. The data processing apparatus according to claim 1, wherein for at least one program instruction, the domain checking comprises determining a plurality of the domains as an allowed selected domain for the program instruction.

22. The data processing apparatus according to claim 21, wherein said at least one program instruction comprises a guard instruction.

23. The data processing apparatus according to claim 21, wherein the processing circuitry is configured to trigger an error when the program instruction at the target address is not a guard instruction.

24. The data processing apparatus according to claim 1, wherein for at least one control flow altering instruction performed in the secure domain, then the processing circuitry is configured to switch from operating in the secure domain to operating in the less secure domain before switching to processing the program instruction at the target address.

25. A data processing apparatus comprising:

processing means for performing data processing operations in response to program instructions, the processing means having a plurality of domains of operation including a secure domain and a less secure domain, wherein when operating in the secure domain the processing means has access to data that is not accessible when operating in the less secure domain;

wherein in response to execution of a control flow altering instruction, the processing means is configured to switch to processing a program instruction at a target address indicated by the control flow altering instruction, and to perform domain selection for determining a selected domain in which the processing means is to operate for the program instruction at the target address; and at least when the control flow altering instruction is executed while operating in the secure domain, then the processing means is configured to:

(i) perform domain checking for determining which of the plurality of domains are allowed to be the selected domain determined by the domain selection for the program instruction at the target address, the domain checking using a different technique than the domain selection; and (ii) trigger a domain check error when the selected domain determined in the domain selection is not an allowed selected domain determined in the domain checking, wherein in response to execution of a control flow altering instruction while operating in the secure domain for which the domain selection determines that the secure domain is the selected domain, the processing means is configured to trigger a domain check error when the secure domain is not an allowed selected domain determined in the domain checking, and to successfully switch control flow to the program instruction at the target address when the secure domain is an allowed selected domain determined in the domain checking, wherein one of the domain selection and the domain checking comprises first determining and the other of the domain selection and the domain checking comprises second determining, wherein the first determining comprises determining the selected domain in dependence upon at least which of a plurality of regions corresponds to an instruction address of the program instruction at the target address, said plurality of regions including a secure region and a less secure region, wherein the secure region is for storing data which is accessible by the processing means when operating in the secure domain and not accessible by the processing means when operating in the less secure domain, and wherein the second determining comprises determining, as the selected domain in which the processing means is to operate for processing said program instruction at the target address, one of the plurality of domains indicated by a target domain value other than the target address.

26. A data processing method for an apparatus comprising processing circuitry for performing data processing operations in response to program instructions, the processing circuitry having a plurality of domains of operation including a secure domain and a less secure domain, wherein when operating in the secure domain the processing circuitry has access to data that is not accessible when operating in the less secure domain; the method comprising:

in response to execution of a control flow altering instruction, switching to processing a program instruction at a target address indicated by the control flow altering instruction;

performing domain selection for determining a selected domain in which the processing circuitry is to operate for the program instruction at the target address; and at least when the control flow altering instruction is executed while operating in the secure domain, then:

(i) performing domain checking for determining which of the plurality of domains are allowed to be the selected domain determined by the domain selection for the program instruction at the target address, the domain checking using a different technique than the domain selection; and (ii) triggering a domain check error when the selected domain determined in the domain selection is not an allowed selected domain determined in the domain checking, wherein in response to execution of a control flow altering instruction while operating in the secure domain for which the domain selection determines that the secure domain is the selected domain, triggering a domain check error when the secure domain is not an allowed selected domain determined in the domain checking, and successfully switching control flow to the program instruction at the target address when the secure domain is an allowed selected domain determined in the domain checking, wherein one of the domain selection and the domain checking comprises first determining and the other of the domain selection and the domain checking comprises second determining, wherein the first determining comprises determining the selected domain in dependence upon at least which of a plurality of regions corresponds to an instruction address of the program instruction at the target address, said plurality of regions including a secure region and a less secure region, wherein the secure region is for storing data which is accessible by the processing circuitry when operating in the secure domain and not accessible by the processing circuitry when operating in the less secure domain, and wherein the second determining comprises determining, as the selected domain in which the processing circuitry is to operate for processing said program instruction at the target address, one of the plurality of domains indicated by a target domain value other than the target address.

* * * * *